United States Patent [19]

Helfman

[11] Patent Number: 4,942,752
[45] Date of Patent: Jul. 24, 1990

[54] APPARATUS FOR REFORMING AND RESTORING THE SURFACE OF A CYLINDRICAL WORKPIECE MANUALLY

[76] Inventor: Sheldon Helfman, 496 Orange Ave., West Haven, Conn. 06516

[21] Appl. No.: 251,025

[22] Filed: Sep. 26, 1988

Related U.S. Application Data

[63] Continuation of Ser. No. 863,871, May 16, 1986, abandoned, which is a continuation-in-part of Ser. No. 777,486, Sep. 19, 1985, abandoned.

[51] Int. Cl.$^5$ .......................... B23G 7/02; B21H 3/04
[52] U.S. Cl. ........................................ 72/70; 10/1 B; 10/152 R; 72/104; 72/107; 72/118
[58] Field of Search ................ 10/1 R, 1 B, 110, 111, 10/113, 123 R, 123 P, 152 R, 152 T; 72/70, 71, 104, 107, 118, 120, 121, 126, 703; 408/239, 240

[56] References Cited

U.S. PATENT DOCUMENTS

| | | | |
|---|---|---|---|
| 980,197 | 1/1911 | Campbell | 72/107 |
| 981,624 | 1/1911 | Dreier | 10/152 R |
| 1,017,403 | 2/1912 | Garabino et al. | 10/113 X |
| 1,085,643 | 2/1914 | Tewksbury | 10/152 R |
| 1,404,546 | 1/1922 | Roeder | 10/123 R |
| 1,506,027 | 8/1924 | O'Brien | 10/1 B |
| 1,545,162 | 7/1925 | Nelson | 10/1 B |
| 2,699,077 | 1/1955 | Bedker | 72/366 X |
| 2,858,720 | 11/1958 | Duda | 72/104 |
| 3,159,858 | 12/1964 | Appleby | 408/218 |
| 3,626,733 | 12/1971 | Zook | 72/104 |
| 4,096,722 | 6/1978 | Torralba | 10/152 R X |

Primary Examiner—E. Michael Combs

[57] ABSTRACT

A handtool for restoring and reforming the surface of cylindrical workpieces.

9 Claims, 6 Drawing Sheets

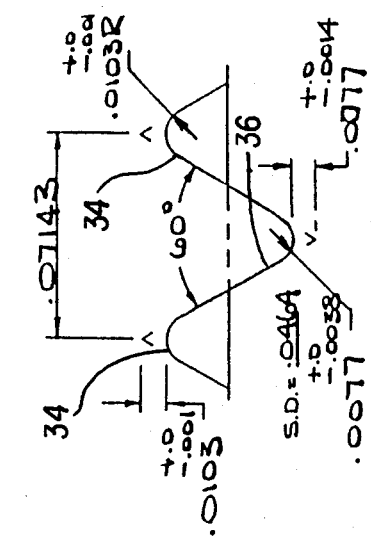
FIG. 10C
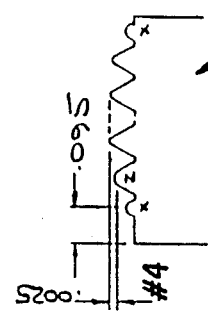
FIG. 10B
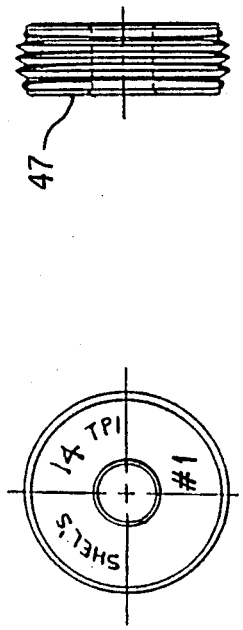
FIG. 10A
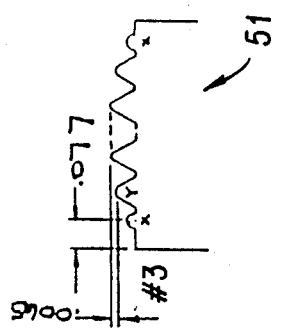
FIG. 10G
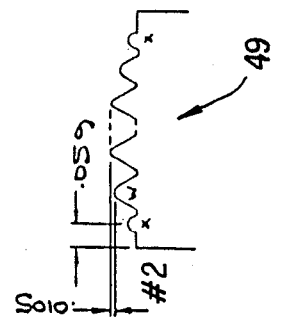
FIG. 10F
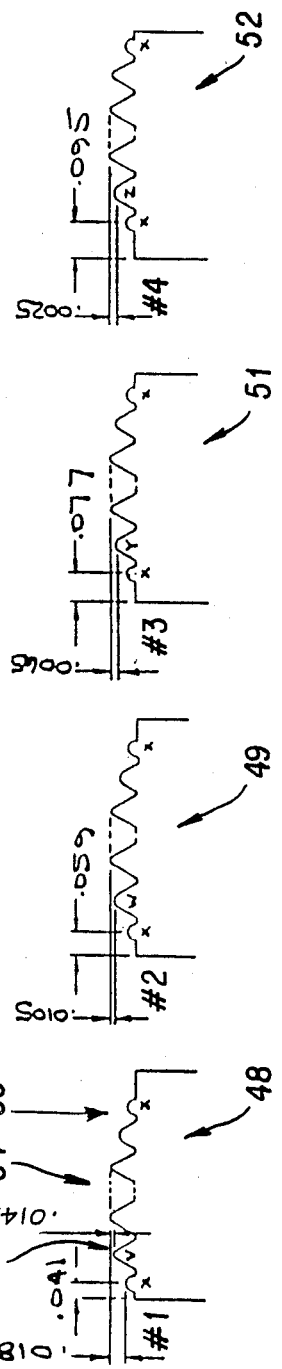
FIG. 10E
FIG. 10D

APPARATUS FOR REFORMING AND RESTORING THE SURFACE OF A CYLINDRICAL WORKPIECE MANUALLY

CROSS REFERENCE TO RELATED APPLICATION

This application is a continuation of application Ser. No. 06/863,871, filed 5/16/86, abandoned, which application is a Continuation-In-Part of U.S. patent application Ser. No. 777,486, filed Sept. 19, 1985, abandoned.

BACKGROUND OF THE INVENTION

The present invention has to do with cold working metal and relates in particular to a method and an apparatus for reforming burred, crossed or mutilated threads on cylindrical workpieces.

The invention also relates to a method and apparatus for cold working the exterior surface of a machined workpiece to increase the effective diameter of the workpiece or to reduce the diameter of a flared end of a tubular workpiece.

Prior art methods and devices which are related to the present invention are disclosed and described in U.S. Pat. No. 981,642, issued Jan. 17, 1911 to Dreier, U.S. Pat. No. 1,017,403, issued Feb. 13, 1912 to Garbarino et al., U.S. Pat. No. 1,085,643, issued Feb. 3, 1914 to Tewksbury and U.S. Pat. No. 1,506,027, issued Aug. 26, 1924 to O'Brien.

The '642 patent shows a set of pipe thread cutting rollers 6. The '403 reference shows a rethreading to tool comprising a number of single land, disc-shaped members 17. The '643 patent shows rollers E for cutting pipe threads and the '027 reference shows a series of discs 16 mounted on inclined spindles 15 to accommodate the lead of threads being restored.

SUMMARY OF THE INVENTION

In contrast to the above prior art disclosures the present invention deals with a metal forming roller having a series of lands and grooves for reforming the exterior surface of a cylindrical workpiece by cold working or "moving metal about" to reform worn threads or to change the exterior diameter of the workpiece.

Consequently, it is a feature of the invention to provide a threaded roller having a given pitch with zero lead for reshaping or restoring right hand or left hand standard screw threads.

A further feature of the invention is the provision of a threaded roller having at least two sets of threads, one set being a "pilot" set and the other set being a forming or working set.

A still further feature of the invention is the provision of a novel method of mounting a threaded roller with zero lead so as to accommodate and engage with a threaded workpiece of equivalent pitch but with a right or left hand lead.

For purposes of this specification the term "lead" is intended to designate the axial advance of a single rotation of a right hand or left hand thread.

The term "pitch" is intended to denote the distance between lands of a thread with or without a lead.

The term "zero" lead is intended to designate parallel lands and grooves with no lead or helix.

Another form of the invention involves a method of working the surface of a cylindrical workpiece by mounting a metal working roller upon a spindle screw or stub shaft so that the roller is free to move radially and axially relative to the shaft in limited fashion.

A method of changing the diameter of a workpiece embracing certain features of the present invention may comprise the steps of securing the workpiece in a clamp with a portion thereof exposed for treatment, surrounding the exposed portion with a plurality of metal forming elements in the form of rollers disposed in a uniform array, each of said rollers having a patterned work surface, moving said rollers into metal working contact with said exposed portion, and thereafter rotating said array of rollers manually about said exposed portion whereby said patterned work surface works the machined surface of said exposed portion to increase the effective diameter thereof.

A method of restoring and reforming a workpiece having deformed or mutilated right hand or left hand threads having a given pitch and a given lead embracing certain other features of the invention may comprise the steps of surrounding the threads with a plurality of rollers disposed in a uniform array, each of said rollers having a cylindrical work surface defining a plurality of circular lands and grooves having a pitch equal to said given pitch but with zero lead, moving said array of rollers uniformly into working contact with said deformed or worn threads so that the lands and grooves of the rollers mate with the grooves and lands of the deformed threads, and, thereafter rotating said array of rollers manually in unison about said deformed thread in the appropriate direction (clockwise or counterclockwise) to restore the deformed threads or to resize worn threads.

A device for working the surface of a cylindrical metallic workpiece to change the effective diameter or to reform and restore threads thereon may comprise a clamp means for holding the workpiece, an adjustable tool holder surrounding the workpiece, a plurality of metal forming tools, means for mounting the tools on the holder in a uniform circular array and means for moving the tools to and fro radially relative to the workpiece.

Finally, a metal working tool, per se, for reforming and restoring threads exhibiting other features of the invention may comprise a roller, a plurality of lands and grooves defining threads having a given pitch and zero lead formed on said roller, said threads being arranged in a plurality of groups or sets defining a pilot thread set and a forming thread set.

Further features and advantages of the present invention will become more apparent from an examination of the succeeding specification when read in conjunction with the appended drawings, in which:

BRIEF DESCRIPTION OF THE DRAWINGS

FIG. 10 is a schematic illustration showing details of a typical group of four (4) metal working rollers for restoring a standard coarse 14 thread per inch screw thread.

DETAILED DESCRIPTION

Figure 1:
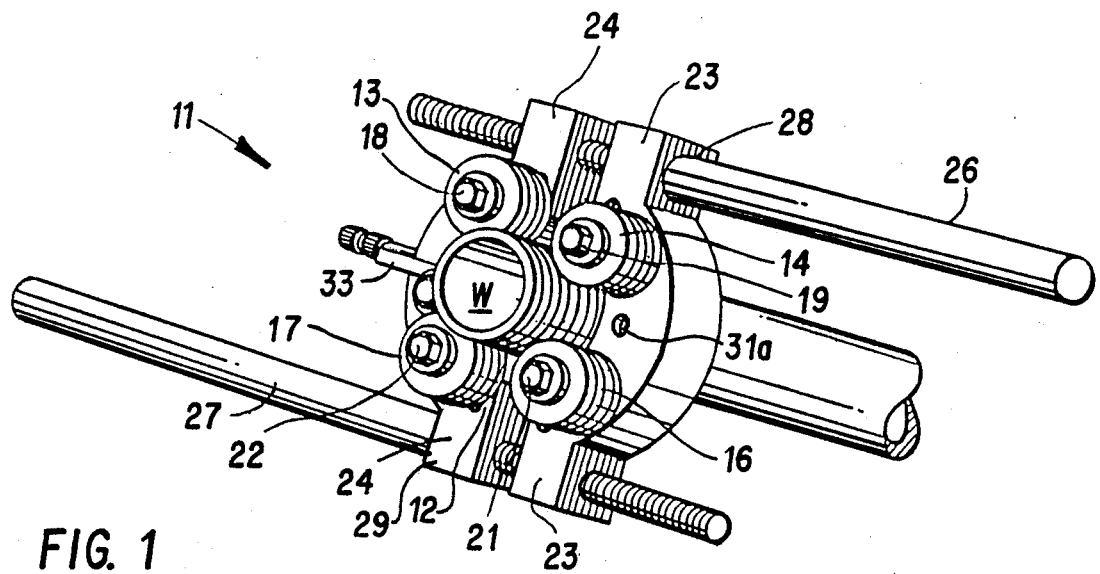
FIG. 1 is a perspective view of the metal working tool of the present invention.

Referring now in detail to the drawings, the reference numeral 11 designates generally a hand operated metal forming or thread restoring tool with a cylindrical workpiece W having deformed, burred, worn or crossed threads 12 in operative engagement with restoring rollers 13, 14, 16 and 17 mounted on spindle screws or stub shafts 18, 19, 21 and 22, respectively.

The shafts 18, 19, 21 and 22 are fixed (threaded) into C-shaped brackets 23 and 24. The brackets are adjustable, to and fro, relative to workpiece W by manual rotation of operating rods 26 and 27.

Rod 26 shouldered at 28, makes a slip fit with bracket 23 and is in threaded engagement with bracket 24.

Correspondingly rod 27 is shouldered at 29, makes a slip fit with bracket 24 and is in threaded engagement with bracket 23.

Note, too, that to accommodate various ranges of workpiece diameters the rollers can be set in different arrays as evidenced by threaded bores 31 and 32, for example.

Figure 3:
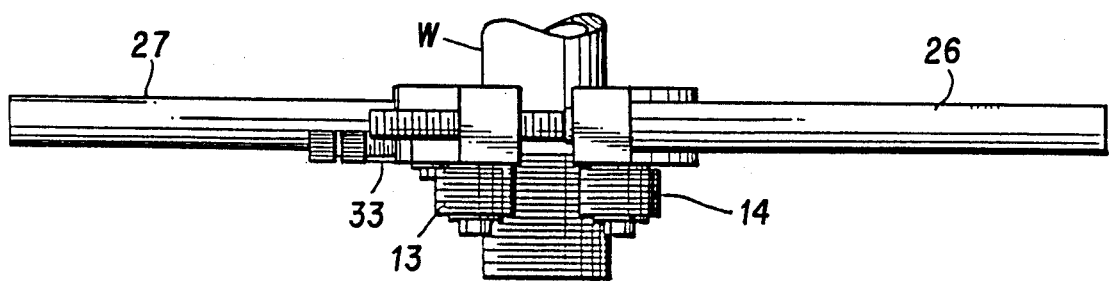
FIG. 3 is a top view of FIG. 2.
Figure 4:
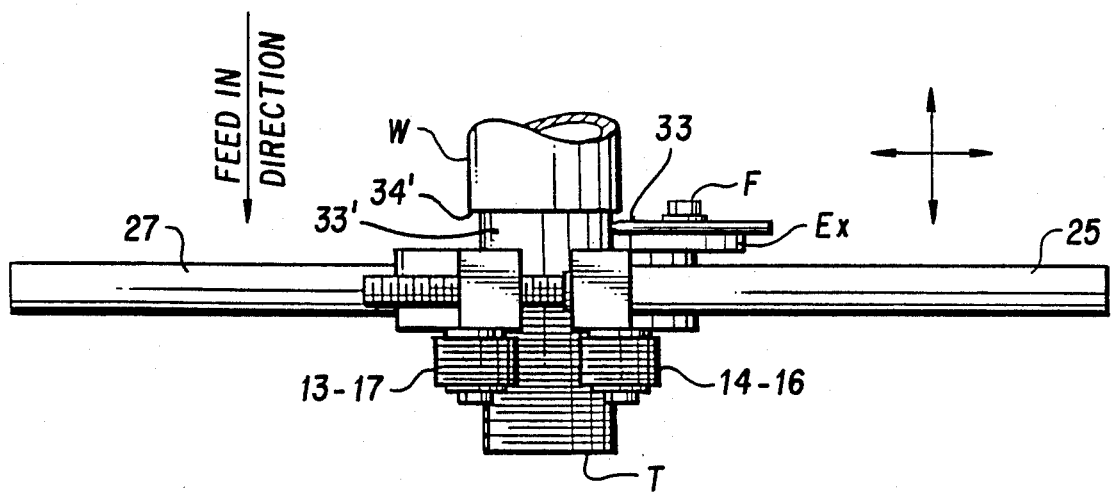
FIG. 4 is a view similar to FIG. 3 showing the tool bit on the opposite side of the metal working tool.
Figure 6A:
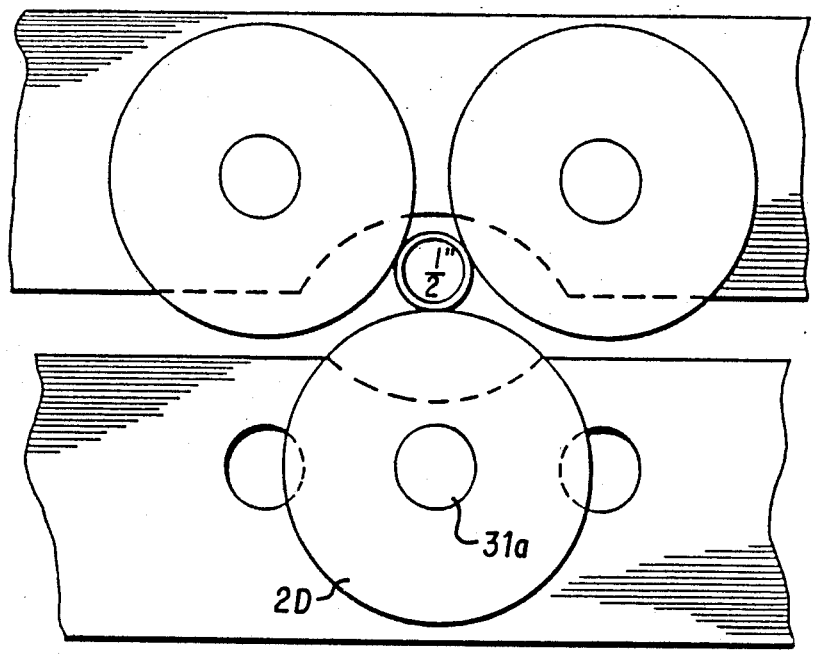
FIGS. 6A, 6B, 7A and 7B are schematic illustrations of the rollers of the metal forming tool arranged in various combinations to accommodate various workpiece diameters.
Figure 6B:
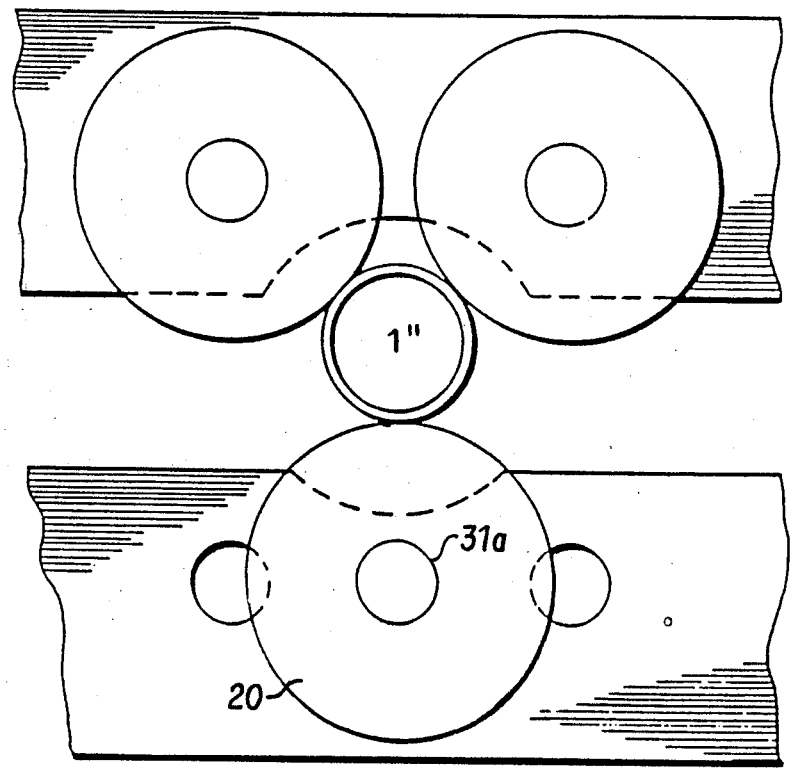

The bracket 24 also provides support for a radially and axially adjustable tool bit 33 for trimming a flared workpiece, reducing the diameter or "cleaning up" a workpiece simultaneously with thread restoration. When it is necessary to clean the shaft 33' or to cut a groove or to lengthen the shoulder 34' on the workpiece W, as seen in FIG. 4, the rollers 13, 14, 16, 17 are removed and replaced on the side opposite the cutter 33 whereat the rollers will initially engage the threads T on the workpiece W causing the tool 11 to advance and force the cutter 33 into engagement with the shaft 33' to effect cleaning. In the instances when it is desirable to form a slot 34' a greater distance inwardly of the threads T, and adapter EX is utilized. The adapter EX is secured to the frame and the tool bit 33 secured thereto by the fastener F. A plurality of the interfitting adapters EX, only one being shown, can be stacked on one another in order to move the cutter 33 inwardly a greater distance. When it is necessary to repair damaged threads T at the end portion of the shaft W, as seen in FIG. 3, the tool 11 is positioned as shown and the tool 11 is turned to cause the rollers 13–17 to move toward the end thereof to reform the same. This procedure is necessary to reform the threads when they have been distorted to an oval shape, or flared or mushroomed caused upon the removal of an article from the shaft. The tool 11 can be used with or without the cutter 33 depending on the condition of the threads. If there is excess material on the threads caused by flaring, etc., it is necessary to use the cutter. If the threads are distorted in a linear direction, the rollers by themselves will form the thread.

While details of the roller structure will be described in greater detail hereinafter, it is to be noted that lands 34 and grooves 36 (FIG. 10) define threads with no lead, i.e., zero lead.

As will become more apparent hereinafter the rollers 13, 14, 16 and 17 are mounted in a particular sequence as they are arranged about the workpiece.

Figure 5:
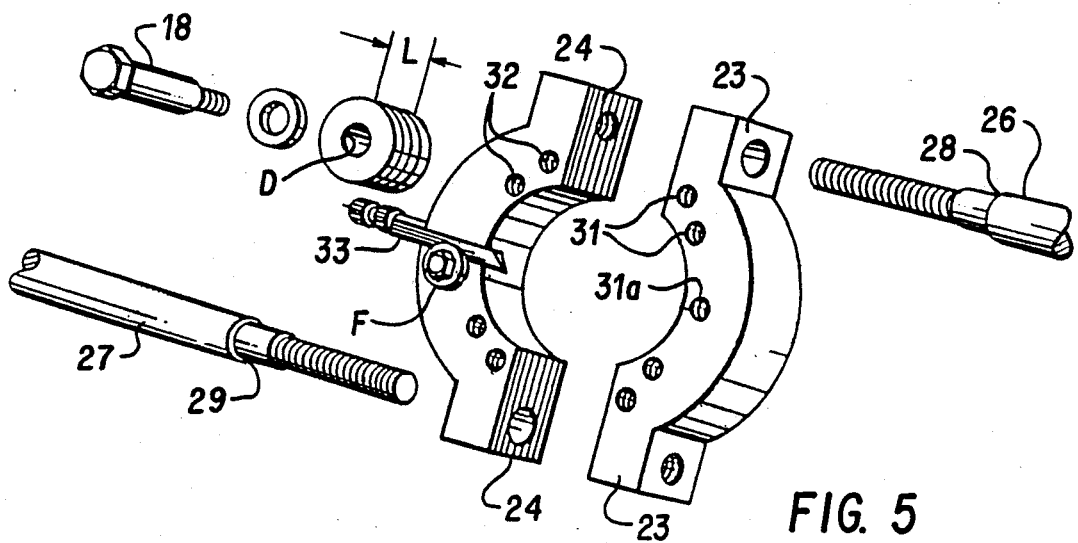
FIG. 5 is an exploded view of the illustration of FIG. 1.

Referring to FIG. 5 the stub shafts 18, 19, 21 and 22 (only shaft 18 shown in FIG. 5) are dimensioned relative to the length L and the internal diameter D of mating rollers to permit limited longitudinal and radial motion of the roller relative to its stub shaft.

This construction aids in accommodating roller threads of zero lead with workpiece threads having the usual and customary right or left hand lead.

The rollers ar heat treated (hardened) to 58–60 of the Rockwell C Scale and the roller threads are ground after hardening.

Figure 7A:
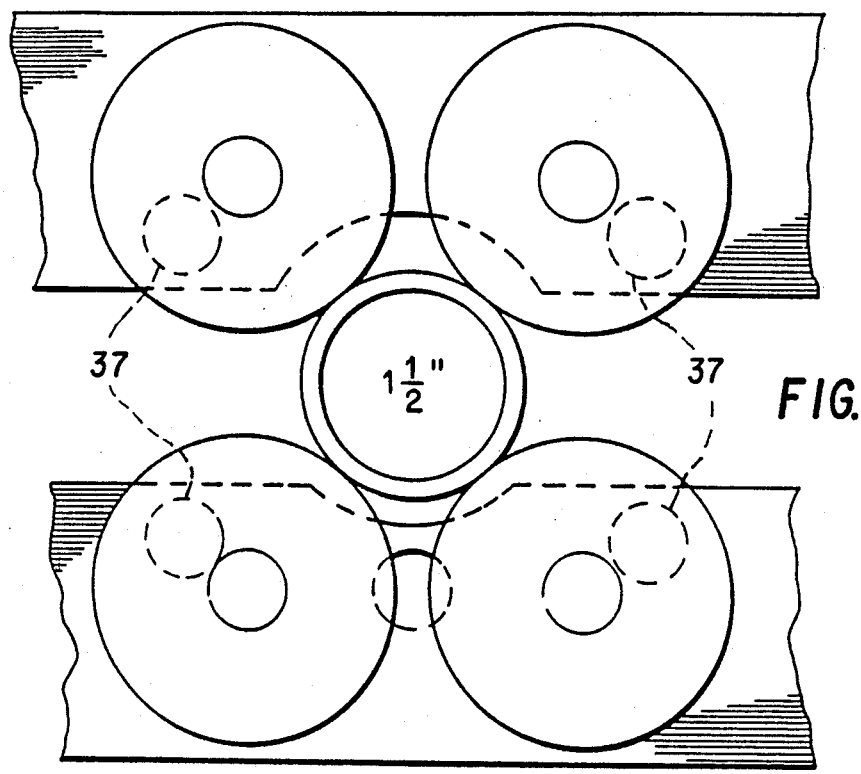
Figure 7B:
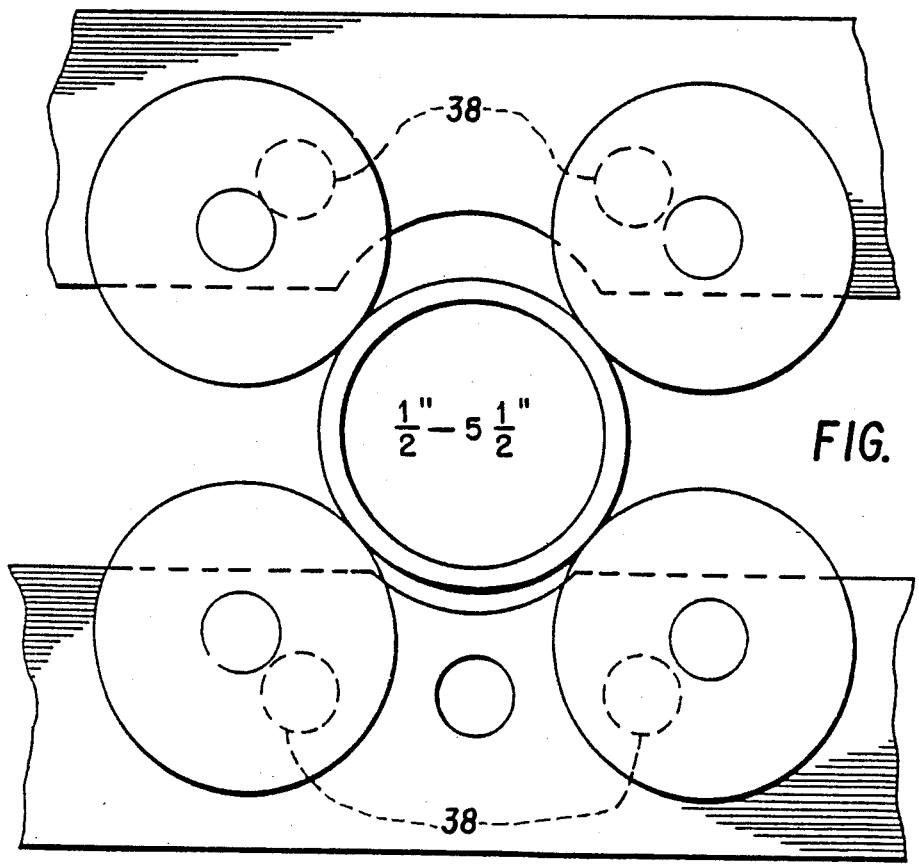

FIGS. 6A through 7B show various arrays of rollers in groups of three (FIGS. 6A and 6B) and in groups of four (FIGS. 7A and 7B).

Small diameter workpieces of the order of ½ inch to 1 inch can be worked successfully with three (3) rollers arranged symmetrically about the workpiece. It is to be noted that a single opening 31a is positioned medially of the holes 31. There is no corresponding or paired hole opposite this in the other part. The function of this opening 31a is to provide the positioning of the single roller 20 shown in the triangular array shown in FIGS. 6A and 6B.

Figure 8:
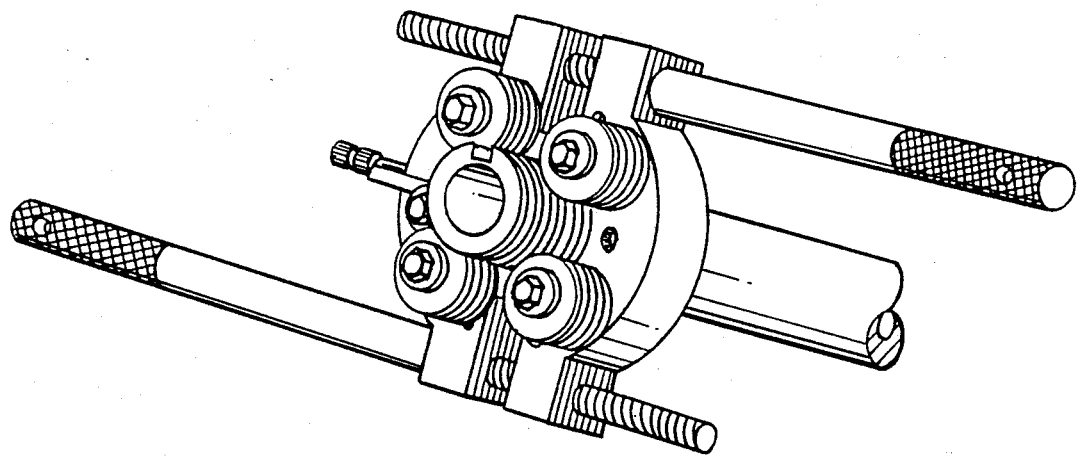
FIG. 8 is a perspective view of the metal working tool set up with a workpiece having deformed threads and key way.

Large diameter workpieces, 1½ to 5½ inches, or workpieces having "flat" spots or keyways (FIG. 8) require four rollers to insure running "true" about the workpiece.

As is further evident in FIGS. 7A & 7B, roller position can be adjusted by selecting, alternatively, the appropriate stub shaft threaded bores 37 and 38.

Figure 9:
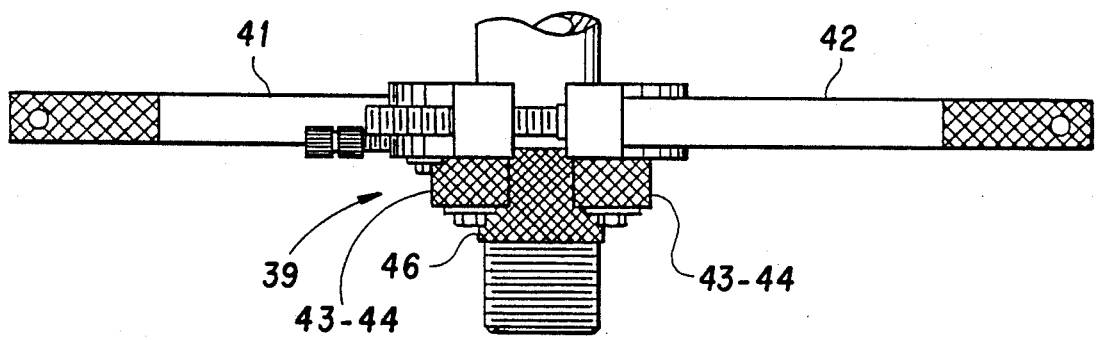
FIG. 9 shows a tool (roller) forming intersecting lands and grooves in the workpiece to enlarge the workpiece diameter.

When it is desired to increase the diameter or to create ornamentation on the workpiece intersecting lands and grooves are ground on the surface of the hardened rollers as indicated at 39 in FIG. 9.

Note that the diameter of a previously relatively accurately machined workpiece can be increased by appreciable amounts to create a new effective diameter by working the workpiece manually with an array of rollers having intersecting lands and grooves, i.e., knurled rollers.

For example, a workpiece having a smoothly machined or threaded diameter of one-half inch or larger can be worked manually by grasping rods 41 and 42 and rotating rollers 43 and 44 about workpiece 46 effective to increase the effective diameter of the workpiece by an amount ranging from 0.002 to 0.020 inches.

In situations where threads are worn to an appreciable extent (wear having reduced the outer thread diameter by as much as 0.020 inches) it is advisable to make two passes over the threads being restored. A first pass is made with a set of forming rollers having a standard root diameter (zero lead) for the thread in question and thereafter a second pass with a set of forming rollers having a deeper than standard thread root so that the diameter of the worn thread is rebuilt or reformed in steps, moving small amounts of metal in each pass.

Referring to FIG. 10 details of typical sets of rollers will be described.

Figure 2:
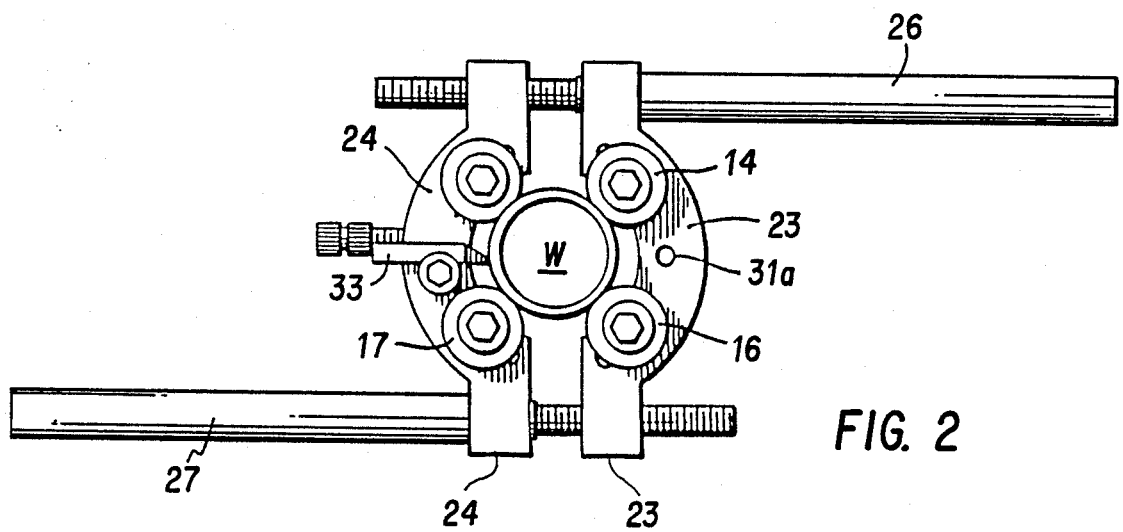
FIG. 2 is a front elevation of the illustration of FIG. 1 with a lathe bit positioned on the front side of the metal working tool.

Each roller of a four (4) set array is disposed about the workpiece W in the C-shaped brackets 23 and 24 at 90° intervals as is most apparent in FIGS. 1 and 2.

The overall roller dimensions are identical and the faces 47 of the rollers are coplanar when mounted.

However, the lands and grooves (threads with zero lead) on each roller are displaced segmentally from roller to roller by a distance representing a portion of the lead of the thread being restored. The displacement distance is a function of the angular position of the roller about the workpiece.

For example, in FIG. 10 the first thread on the first roller 48 is displaced to the right 0.041 and thereafter at 90° intervals the threads are displaced in 0.018 inch increments which, for four (4) rollers, totals 4×0.018 or 0.072, the lead of a 14 thread per inch screw thread.

When restoring threads of right hand lead the rollers 48, 49, 51 and 52 of FIG. 10 are mounted so that the displacement increases clockwise. In a left hand thread restoring the displacement increases counterclockwise.

Alternative to displacing the lands and grooves (threads of zero lead) on the rollers, the rollers may be fabricated identically throughout (no displacement of threads) and each roller may be offset incrementally from a base plane, clockwise or counterclockwise, as the lead of the workpiece may require.

An alternative method of adapting the tool from right hand mode to left hand mode without remounting the rollers is effected by merely reversing the tool 180°.

Upon further examination of FIG. 10 is is apparent that the lands and grooves (threads of zero lead) on the rollers includes two sets of threads. A first set 53 defines a "pilot" set and a second set 54 defines a metal working set.

For example roller 48 includes four (4) threads in the pilot set and five (5) threads in the working set.

Note too that the diameter of the second pilot thread of each roller increases in 0.004 inch increments from roller to roller as they are arrayed about the workpiece.

The pilot threads serve as guides to ease the rollers and thus the metal working threads into the region of the workpiece requiring thread restoration.

In some situations where the workpiece is of large diameter and the forming tool necessarily heavy it is admissible to establish a seat on the workpiece or to attach a collar to the workpiece to provide a base plane which is generally perpendicular to the longitudinal axis of the workpiece.

The rollers are advanced into the workpiece until the apex of the working threads bottom is the root of the threads being restored.

Thereafter the metal forming tool is operated manually by grasping and rotating the rods 26 and 27 about the fixed workpiece W in a clockwise or counterclockwise direction as the case requires.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A device for manually working the surface of a cylindrical metallic workpiece to selectively increase the effective diameter of the workpiece and to reform and restore threads thereon comprising a pair of oppositely disposed C-shaped brackets defining a work receiving opening therebetween for surrounding the work when disposed therein, each of said C-shaped brackets having a plurality of spaced openings therein, said openings in one bracket opposing and being aligned with openings in the other bracket, a plurality of metal forming rollers each having swaging threads on their outer surface, said swaging rollers having opposite end portions, each of said end portions being provided with identical pilot thread sections having pilot swaging threads of progressively increasing crest diameter extending respectively from opposite ends of said rollers inwardly to an intermediate swaging thread section having swaging threads of constant crest diameter to permit thread reforming when said rollers are mounted with either of said roller end portions positioned outwardly of and spaced from said brackets, means for removably securing each of said rollers in a selected opening to obtain a variable dispositional array of the rollers and their engagement with a workpiece disposed in said work receiving opening, to thereby accommodate the device to workpieces of different diameters, said removable securing means including a stub shaft extending through a bore in each of said rollers and extending into one of said openings in said C-shaped brackets, a pair of openings provided in each bracket disposed normal to said stub shaft openings, and opposing handle means extending through said pairs of openings for securing the C-shaped brackets together about the work, whereby the handles can be engaged to move the metal working rollers toward and away relative to the workpiece and the surface of the metallic workpiece is worked manually by grasping the handle means and rotating the C-shaped brackets and associated rollers about the workpiece.

2. The rollers of claim 1 wherein said swaging threads have zero lead.

3. The device of claim 1 wherein each of said C-shaped brackets define a planar surface whereby when said roller stub shafts are positioned in their respective openings, each are parallel to the axis of the workpiece.

4. The device of claim 1 wherein both the stub shaft openings and the stub shafts are threaded to removably secure one to the other.

5. The device of claim 2 wherein both the stub shaft openings and the stub shafts are threaded to removably secure one to the other.

6. The device of claim 4 wherein each of said stub shafts received in each rollers bore is dimensioned relative to the length and diameter of the bore to provide limited axial and radial motion of the roller relative to the stub shaft.

7. The device of claim 5 wherein each of said stuf shafts received in each roller bore is dimensioned relative to the length and diameter of the bore to provide limited axial and radial motion of the roller relative to the stub shaft.

8. The device of claim 1 wherein a lathe cutter is mounted adjacent to one of said plurality of spaced openings.

9. The device of claim 8 wherein a removable adapter is mounted adjacent to one of said plurality of spaced openings, said lathe cutter being mounted on said adapter.

* * * * *